(12) United States Patent
Shiohara (10) Patent No.: US 9,253,343 B2
(45) Date of Patent: Feb. 2, 2016

(54) INFORMATION PROCESSING APPARATUS, CONTROL METHOD, AND STORAGE MEDIUM FOR PROVIDING A PREVIEW AND/OR DISPLAY OF A MAIN DISPLAY DOCUMENT GENERATED FROM ALL PARTS OF A PRINT DOCUMENT

(75) Inventor: Tetsuya Shiohara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 462 days.

(21) Appl. No.: 13/473,981

(22) Filed: May 17, 2012

(65) Prior Publication Data

US 2012/0297299 A1 Nov. 22, 2012

(30) Foreign Application Priority Data

May 20, 2011 (JP) ................................. 2011-113826

(51) Int. Cl.
*H04N 1/00* (2006.01)
(52) U.S. Cl.
CPC ............................... *H04N 1/00405* (2013.01)
(58) Field of Classification Search
USPC .......................................... 715/274, 277, 253
See application file for complete search history.

(56) References Cited

U.S. PATENT DOCUMENTS

| | | | |
|---|---|---|---|
| 5,737,599 A * | 4/1998 | Rowe et al. | |
| 6,744,452 B1 * | 6/2004 | McBrearty et al. | ............ 715/853 |
| 7,313,758 B2 * | 12/2007 | Kozlov | ......................... 715/234 |
| 7,385,712 B2 * | 6/2008 | Nakagiri et al. | ............. 358/1.12 |
| 7,469,380 B2 * | 12/2008 | Wessling et al. | ............... 715/273 |
| 2003/0002056 A1 * | 1/2003 | Yamaguchi et al. | ........... 358/1.2 |
| 2004/0049741 A1 * | 3/2004 | Natori | ........................... 715/527 |
| 2006/0209329 A1 * | 9/2006 | Akiyama | ..................... 358/1.13 |
| 2007/0109581 A1 * | 5/2007 | Saitoh | ......................... 358/1.13 |
| 2007/0180364 A1 * | 8/2007 | Kobayashi | ............ G06F 17/212 715/210 |
| 2007/0291297 A1 * | 12/2007 | Harmon et al. | ............... 358/1.15 |
| 2008/0143890 A1 * | 6/2008 | Rosencwaig et al. | ......... 348/836 |
| 2009/0241024 A1 | 9/2009 | Shiohara | |
| 2009/0254807 A1 * | 10/2009 | Singh et al. | .................... 715/234 |
| 2010/0162106 A1 * | 6/2010 | Ikazaki et al. | ................ 715/274 |
| 2010/0162139 A1 * | 6/2010 | Beebe et al. | .................. 715/760 |
| 2011/0157215 A1 * | 6/2011 | Aoyagi | ......................... 345/593 |
| 2011/0179354 A1 * | 7/2011 | Park | .............................. 715/274 |

FOREIGN PATENT DOCUMENTS

| | | |
|---|---|---|
| EP | 2124143 A2 | 11/2009 |
| JP | 2003-177905 A | 6/2003 |
| JP | 2003-177905 A | 6/2003 |
| JP | 2009-282843 A | 12/2009 |

OTHER PUBLICATIONS

Edition; Apr. 11, 2010; Merriam-Webster.com; pp. 1-2.*

* cited by examiner

*Primary Examiner* — Andrew Dyer
(74) *Attorney, Agent, or Firm* — Canon USA, Inc. IP Division

(57) ABSTRACT

An information processing apparatus generates a temporary display document including limited pages together with a main display document corresponding to print data, and displays the temporary display document until generation of the main display document is completed, thereby reducing a time taken to display a part of pages.

25 Claims, 8 Drawing Sheets

INFORMATION PROCESSING APPARATUS, CONTROL METHOD, AND STORAGE MEDIUM FOR PROVIDING A PREVIEW AND/OR DISPLAY OF A MAIN DISPLAY DOCUMENT GENERATED FROM ALL PARTS OF A PRINT DOCUMENT

BACKGROUND OF THE INVENTION

1. Field of the Invention

The present invention relates to a printing system including, for example, a preview function of displaying a print image to a user before execution of print processing.

2. Description of the Related Art

In a printing system using a computer provided with Windows (registered trademark) of Microsoft Corporation as an operating system (OS), print data generated by, for example, an application program is stored in a spool file in a data format standard for the OS.

The OS calls up a printer driver for printing the print data. Then, the printer driver reads the print data stored in the spool file, causes an image generation processing unit to generate a print image, and then converts it to a print command interpretable by a printer. The print command is transmitted to the printer. The printer interprets the print command and generates an image onto a recording medium, thereby performing print processing.

In this printing system, generally, a preview function is realized in the following manner. The printer driver activates a previewer, which functions to display the print image, when the print processing starts. Then, the image generation processing unit generates a print image for use in a preview, and the previewer displays this print image for the preview. Regarding this preview function, there is a technique of speeding up a preview display by starting with a display of a page for which image generation has been completed (Japanese Patent Application Laid-Open No. 2003-177905).

On the other hand, in recent years, there has appeared a printing system using the Extensible Markup Language Paper Specification (XPS) format as a data format stored in the spool file, instead of the Enhanced Meta File (EMF) format employed by the conventional technique. This printing system also employs an XPS printer driver that supports XPS documents as a printer driver.

The XPS format is an open standard electronic document format developed by Microsoft Corporation, and a display unit therefor is provided by the operating system (OS). According to the conventional technique, a print preview is displayed by conversion of print data into an image. However, the XPS printer driver can display a preview of an XPS document set as print data without converting it into an image by utilizing the display unit provided by the OS, while the conventional technique displays a preview by converting print data into an image.

When the XPS printer driver uses an XPS document set as print data for a preview without converting it, the XPS printer driver outputs preview data from the print data that is being processed to be printed. However, among filters (which will be described below) constituting the XPS printer driver, some of them employ an interface configured to receive an XPS document as parts into which the XPS document is divided.

If such an interface is used for print processing, data is processed in the form of individual parts constituting the XPS document and does not take a form of an XPS document, so that an XPS document for a preview should be constructed from the parts. All of the parts constituting the XPS document are required for construction of the preview XPS document corresponding to the print data from the parts.

However, for example, if the document includes a large number of pages, it takes long time until the filter can acquire all of the parts. Accordingly, it takes long time to generate a preview document (in the present invention, this will be also referred to as a "main display document"), thereby delaying realization of a preview display by the previewer.

SUMMARY OF THE INVENTION

The present invention is directed to a method of reducing a time until a user can check a preview display in a printer driver that processes print data as parts constituting the print data.

According to an aspect of the present invention, an information processing apparatus, which is configured to display a main display document generated from all parts of a print document, includes a temporary display document generation unit configured to generate a temporary display document to be displayed prior to the main display document based on fewer than all parts of the print document, a display unit configured to display the temporary display document generated by the temporary display document generation unit, a main display document generation unit configured to, when all parts of the print document are acquired, generate the main display document based on all parts of the print document, and a change unit configured to change a display from the temporary display document to the main display document when the main display document generation unit generates the main display document.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 8:
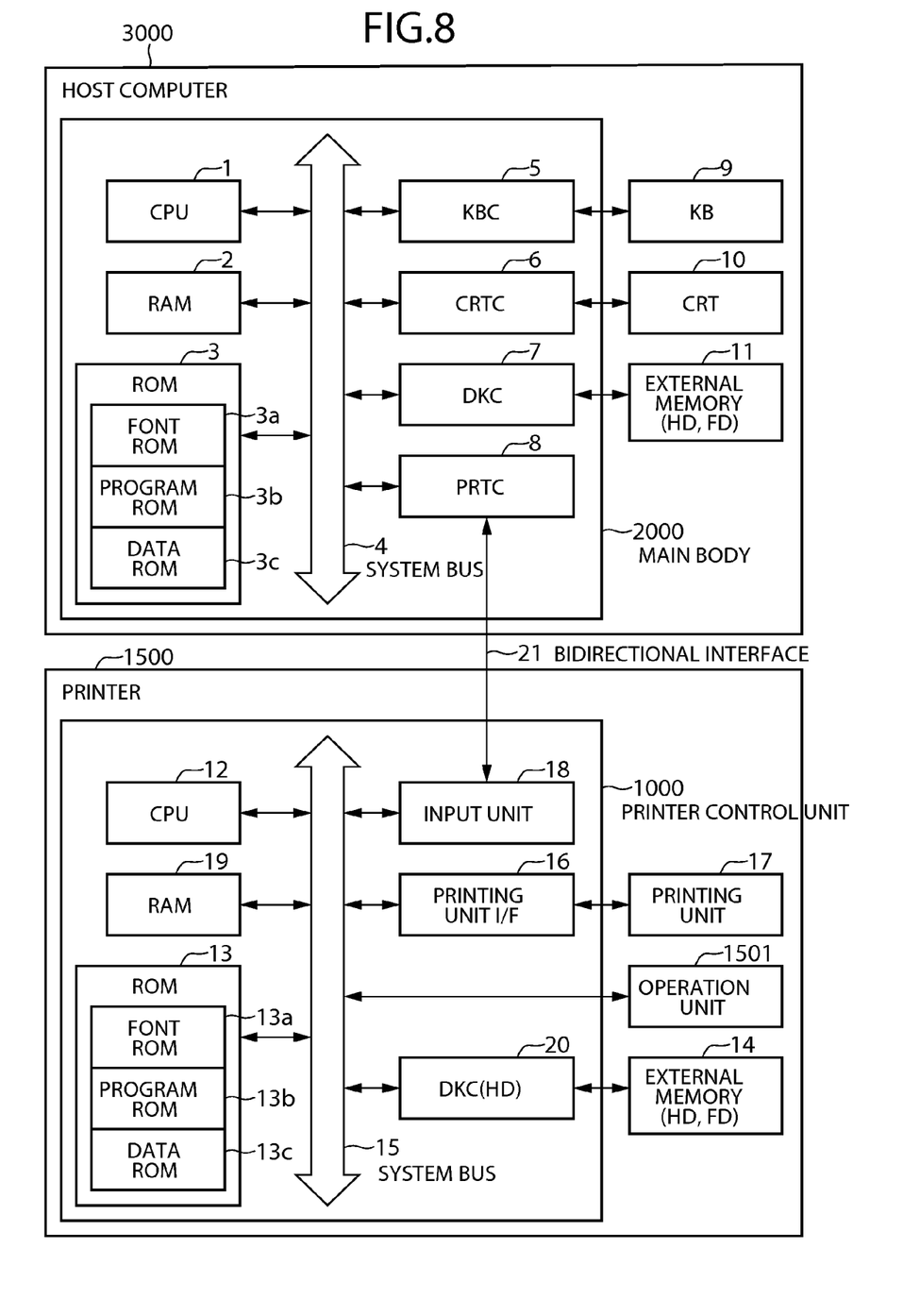
FIG. 8 illustrates hardware configurations of a host computer and a printer according to the exemplary embodiment of the present invention.

FIG. 8 is a diagram illustrating a hardware configuration of an information processing apparatus that executes processing according to an exemplary embodiment of the present invention.

Referring to FIG. 8, a host computer 3000 includes a central processing unit (CPU) 1. The CPU 1 processes a document including constituent elements such as graphics, images, characters, and tables (including, for example, spreadsheet data) based on a program such as a document processing program (an application program) stored in a program read-only memory (ROM) 3b of a ROM 3 or an external memory 11. Further, the CPU 1 centrally controls the respective devices connected to a system bus 4 in a host computer main body 2000.

Further, the program ROM 3b of the ROM 3 or the external memory 11 also stores programs such as an operating system program (hereinafter referred to as an "OS") , which is a control program of the CPU 1. Further, a font ROM 3a of the ROM 3 or the external memory 11 stores data such as font data used in the above-described document processing. Further, a data ROM 3c of the ROM 3 or the external memory 11 stores various kinds of data used in various kinds of processing such as the above-described document processing.

A random access memory (RAM) 2 functions as, for example, a main memory and a work area of the CPU 1. A keyboard controller (KBC) 5 controls a key input from a keyboard (KB) 9 and a pointing device (not illustrated) . A cathode-ray tube (CRT) controller (CRTC) 6 controls a display of a CRT display (CRT) 10. A liquid crystal display (LCD) controller and an LCD maybe used instead of the CRT controller 6 and the CRT display 10.

A disk controller (DKC) 7 controls access to the external memory 11 such as a boot program, various kinds of applications, font data, a user file, and an edition file. Further, the DKC 7 also controls access to the external memory 11 such as a hard disk (HD) and a floppy (registered trademark) disk (FD) storing various kinds of data such as a print control command generation program (hereinafter referred to as a "printer driver").

A printer controller (PRTC) 8 is connected to a printer 1500 via a predetermined bidirectional interface 21, and controls communication with the printer 1500. Examples of types of the bidirectional interface 21 include a universal serial bus (USB) interface, an Institute of Electrical and Electronics Engineers (IEEE) 1394 interface, and a wireless local area network (LAN) interface.

The CPU 1 realizes What You See Is What You Get (WYSIWYG) on the CRT 10 by, for example, rasterizing an outline font onto a display information RAM set on the RAM 2 to provide a graphical user interface (GUI). Further, the CPU 1 opens registered various kinds of windows based on commands instructed by, for example, a mouse cursor (not illustrated) on the CRT 10, and performs various kinds of data processing.

When a user wants to print data, the user opens a window regarding print settings, and can select settings of the printing method addressed to the printer driver, including settings of the printer 1500 and selection of a print mode.

In the printer 1500, a printer CPU 12 centrally controls the respective devices connected to a system bus 15 in a printer control unit 1000. Further, the printer CPU 12 outputs an image signal as output information to a printing unit (printer engine) 17 connected to the system bus 15 based on a program such as a control program stored in a program ROM 13b of a ROM 13 or an external memory 14.

The program ROM 13b of the ROM 13 stores a program such as a control program of the printer CPU 12. A font ROM 13a of the ROM 13 stores data such as font data for use in generation of the above-described output information. Further, in a case where the printer 1500 does not include the external memory 14 such as a hard disk (HD) and an integrated circuit (IC) card, a data ROM 13c of the ROM 13 stores, for example, information for use in the host computer 3000.

The printer CPU 12 is communicable with the host computer 3000 via an input unit 18, and is configured to be able to notify the host computer 3000 of various kinds of information such as status information in the printer 1500.

A RAM 19 functions as, for example, a main memory and a work area of the CPU 12. This RAM 19 is configured to allow an expansion of the memory capacity by an optional RAM connected to an expansion port (not illustrated) . The RAM 19 is used as, for example, an output information rasterization area, an environmental data storage area, and a non-volatile RAM (NVRAM).

Access to the external memory 14 is controlled by a DKC 20. The external memory 14 is optionally connected, and stores data such as font data, an emulation program, and form data. Further, an operation unit 1501 includes, for example, an operation panel, a switch, and a light emitting diode (LED) display unit for realizing various kinds of operations applied to the printer 1500.

The number of provided external memories 14 is not limited to one. The printer 1500 includes at least one external memory 14, and may be configured to allow connections of a plurality of external memories storing an optional font card besides a built-in font, and a program for interpreting a printer control language of a different language system. Further, the printer 1500 may include an NVRAM (not illustrated), and may be configured to store printer mode setting information instructed from the operation unit 1501.

The printer 1500 in the present exemplary embodiment may be any apparatus capable of printing data in response to a print command, and may be an inkjet printer or a laser beam printer.

First, the XPS structure will be briefly described for facilitating understanding of the present invention. An XPS document is based on a tree structure with a FixedDocumentSequence (hereinafter referred to as a "FDS") set as a root thereof. The FDS includes a plurality of FixedDocuments (hereinafter referred to as "FDs"), and the FD includes a plurality of FixedPages (hereinafter referred to as "FPs").

Each of the FDS, the FD, and the FP is often referred to as an "XPS part". The FP has content of a page of a document written in the XML format, and contains the content to be actually displayed or printed. Resources such as a font and an image used in the page content of the FP can be shared among the plurality of FPs. Further, each of the FDS, the FD, and the FP can have print setting information as a PrintTicket (hereinafter referred to as a "PT"). The PT is the print setting information written in the XML format, which indicates the settings in printing of an XPS document.

Figure 1:
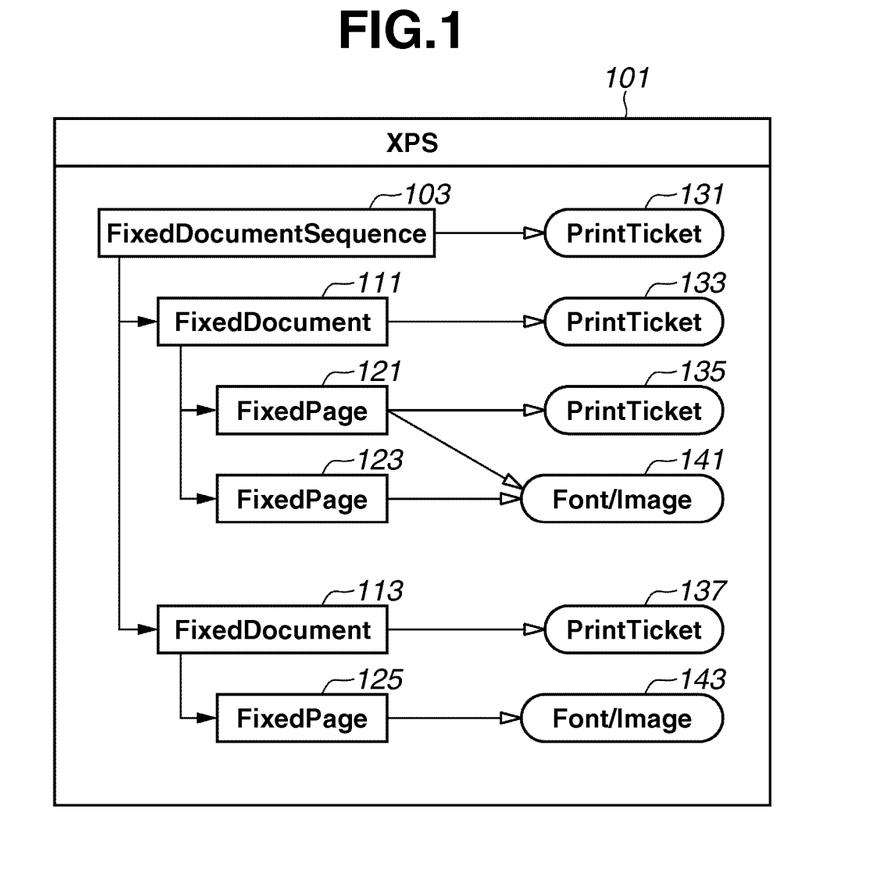
FIG. 1 is a conceptual diagram illustrating a logical structure of an XPS document.

FIG. 1 is an exemplary block diagram illustrating a logical structure of an XPS document.

A logical structure of an XPS document 101 is a tree structure with an FDS 103 set as a root thereof. The FDS 103 has an FD 111 and an FD 113 as children. The FD 111 has an FP 121 and an FP 123 as children. The FD 113 has an FP 125 as a child.

Regarding the PT in which the print setting information is written, the FDS 103 has a PT 131, the FD 111 has a PT 133, the FP 121 has a PT 135, and the FD 113 has a PT 137. The FP 123 and the FP 125 have no PT. Further, the FP 121 and the FP 123 share a resource 141 such as a font and an image. The FP 125 utilizes a resource 143 such as a font and an image. In the present exemplary embodiment, for example, the PT for use in printing of the FP 121 is a PT formed by merging the PT 131, the PT 133, and the PT 135.

Figure 2:
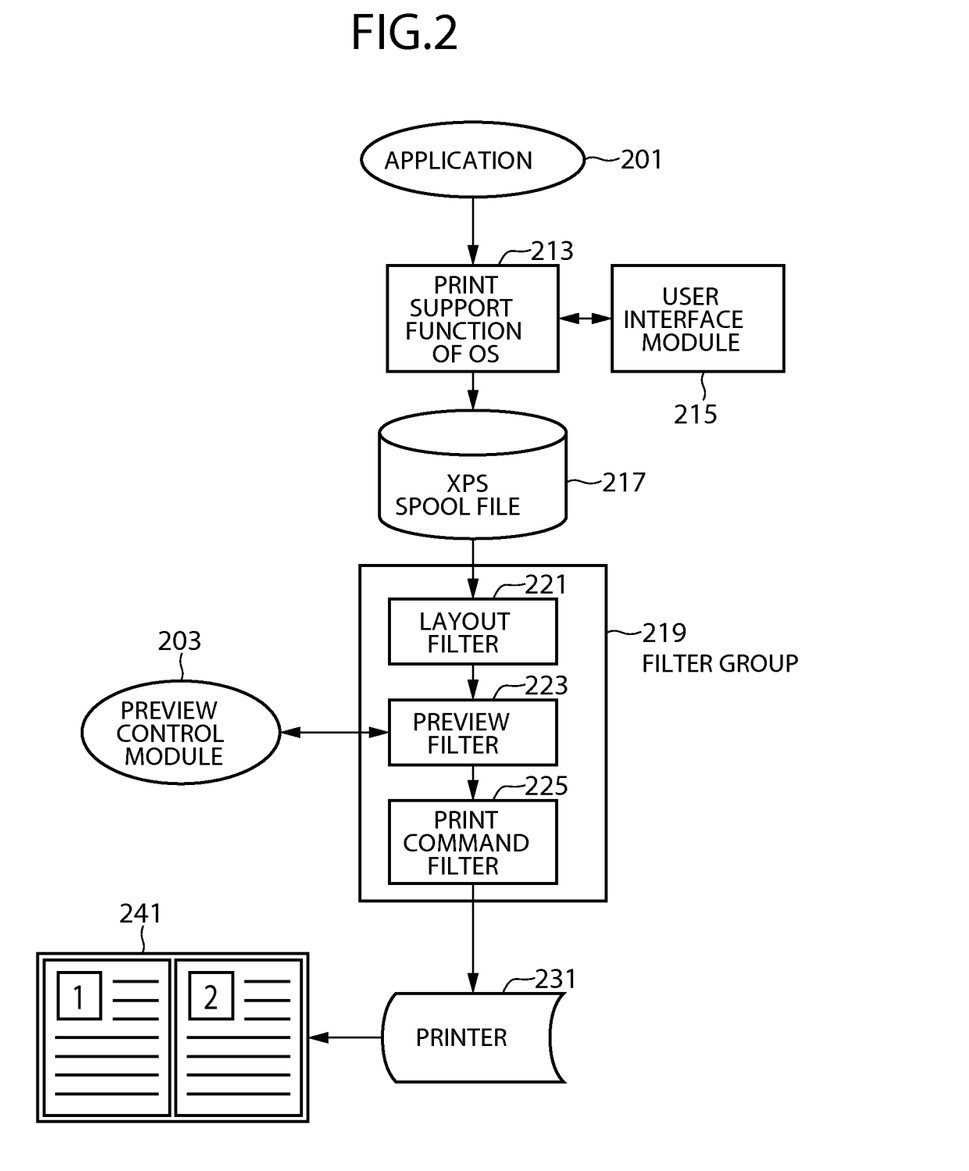
FIG. 2 is a block diagram illustrating an example of a printer driver according to an exemplary embodiment of the present invention.

FIG. 2 is a block diagram conceptually illustrating a printing system, focusing on a print support function of the OS and a printer driver.

An XPS printer driver mainly includes a filter group 219. Generally, the term "filter" refers to a program functioning to output some data based on input data via a unit such as a processing unit, a conversion unit, a non-conversion unit, and a generation unit.

In the printing system illustrated in FIG. 2, print data of each page of a document generated by an application 201 is temporarily stored in an XPS spool file 217 via a print support function of the OS 213. The printing system is configured in such a manner that the filter group 219 of the printer driver generates a print command interpretable by a printer 231 based on print data and the print setting information regarding that print data, and supplies the generated print command to the printer 231, thereby causing the printer 231 to print the print data.

Generally, a user interface module 215 provides a function of setting a paper size, a print direction, and other attributes used in printing. For example, the user interface module 215 displays a setting screen allowing the user to set the print setting information such as the paper size and the printing method. At the same time, the user interface module 215 according to the present exemplary embodiment has the function of setting whether to display a preview of a print image before the printer 231 starts a printing operation. The user interface module 215 returns the print setting information containing the set values of a plurality of print setting items to the application 201. The user interface module 215 is a module for displaying the setting screen of the printer driver.

When an arbitrary one of generated documents is printed, the application 201 notifies the print support function of the OS 213 of a print start, a print end, the print setting information returned from the user interface module 215, and a rendering start and a rendering end of each page of the document. The print support function of the OS 213 stores the content rendered by the application 201 and the print setting information in the XPS spool file 217. The filter group 219 is called up by the print support function of the OS 213 when the spooled print data is despooled.

The filter group 219 of the printer driver includes one or more filters, and functions to read print data from the XPS spool file 217 at the time of printing, convert the print data into a print command interpretable by the printer 231, and supply the print command to the printer 231, thereby realizing print processing.

In the present exemplary embodiment, the filter group 219 includes a layout filter 221, which is a layout processing unit, a preview filter 223, which is a preview document generation unit, and a print command filter 225, which is a print command conversion unit.

The layout filter 221 inputs print data of an XPS document stored in the XPS spool file 217, performs layout processing on the page based on the print setting information, and outputs the print data of the XPS document with the layout thereof properly adjusted. In the present exemplary embodiment, the layout processing includes, for example, multiple-up printing, which prints a plurality of pages on a single sheet surface, and poster printing, which prints a single page across a plurality of sheet surfaces.

The preview filter 223 inputs the print data of the XPS document output from the layout filter 221, and provides the preview function to the user based on the print setting information.

The print command filter 225 inputs the print data of the XPS document output from the preview filter 223, converts the XPS document into a print command interpretable by the printer 231 according to the print setting information, and outputs the print command.

In a case where the print command filter 225 once converts an input XPS document into image data, generally, this print command filter 225 is referred to as a "render filter". The render filter is often included in a printer driver for an inexpensive raster printer represented by an inkjet printer. In a case where the print command filter 225 operates as a render filter, the print command filter 225 once converts an input XPS document into image data. After that, the print command filter 225 converts the image data into a print command interpretable by the raster printer after image processing such as conversion of the color space and binarization.

In a case where the printer 231 is a high-functional printer represented by a page printer, and XPS is included in types of print commands interpretable by the printer 231, the print command filter 225 edits an input XPS document and outputs the edited XPS document. In a case where an XPS document does not have to be processed by the print command filter 225, needless to say, the print command filter 225 may output the input XPS document without any processing applied thereto, or the print command filter 225 may be omitted from the configuration of the printer driver.

The printer 231, which is an output device, is provided with a function of interpreting a print command generated by the print command filter 225, and forming a visible image on a print sheet. An exemplary print result 241 illustrated in FIG. 2 is an example when the layout filter 221 performs two-up layout processing.

As described above, the XPS printer driver includes filters respectively having arbitrary functions. As interfaces for an exchange of data between filters, there are two types of interfaces, namely, the Stream format and the Document format.

According to the interface of the Stream format, print data is processed as a byte stream without being converted or divided. Further, even data that is not XPS data can be also processed as a byte stream.

According to the interface of the Document format, an XPS document set as print data is processed as each of XPS parts constituting the XPS document. The term "XPS part" here refers to an FDS, an FD, an FP, and a resource accompanying them such as a PT, an image, and a font. Which interface is to be employed is determined for each of an input and an output of each filter.

Compared to a filter using the Stream format for its input, a filter using the interface of the Document format does not have to analyze an XPS document to extract an XPS part. Therefore, the filter using the interface of the Document format can facilitate processing such as the layout processing which requires a change in an FP.

Figure 3:
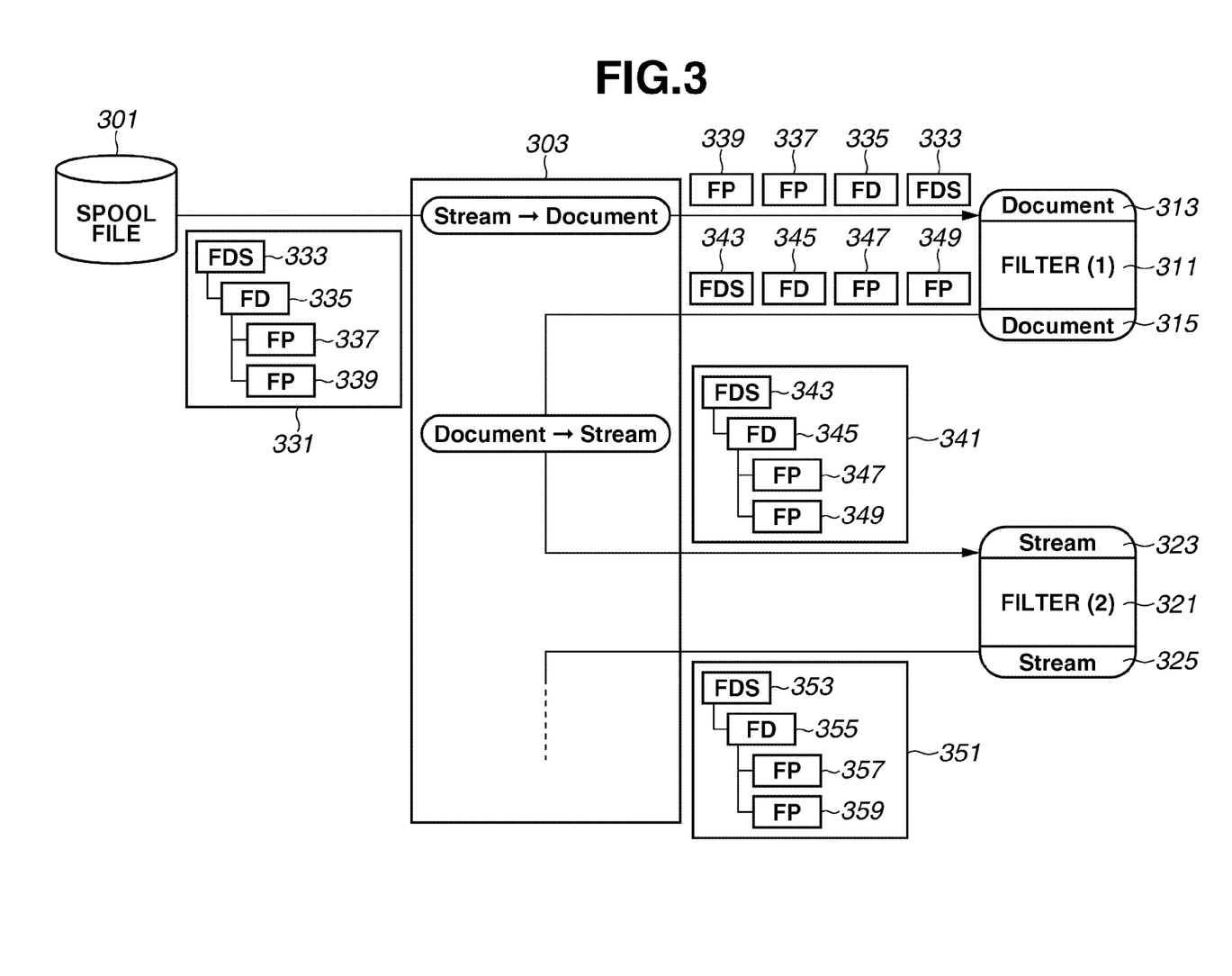
FIG. 3 illustrates interfaces usable by filters of the XPS printer driver.

An operation of each interface will be described with reference to FIG. 3.

A filter 311 employs the Document format as an input interface 313 and an output interface 315 thereof, and a filter 321 employs the Stream format as an input interface 323 and an output interface 325 thereof. An XPS document 331 stored as a spooled file includes XPS parts 333, 335, 337, and 339.

First, the XPS document 331 is transmitted to the filter 311. Since the input interface 313 of the filter 311 is the Document format, the XPS document 331 is divided into XPS parts by a system 303, and then is transmitted as the XPS parts.

The filter 311 edits the received XPS parts 333, 335, 337, and 339 as necessary, and then outputs them. Since the output interface 315 is also the Document format, the output data is XPS parts 343, 345, 347, and 349 generated by editing the XPS parts 333, 335, 337, and 339.

The data of these XPS parts 343, 345, 347, and 349 is transmitted to the filter 321. Since the input interface 323 of the filter 321 is the Stream format, this data is converted into an XPS document 341 based on the XPS parts 343, 345, 347, and 349 by the system 303, and then is transmitted as the XPS document 341.

The filter 321 receives the XPS document 341 as a byte stream. The filter 321 edits the XPS document 341 as necessary, and then outputs it. Since the output interface 325 is also the Stream format, generally, the output data is an XPS document 351 generated by editing the XPS document 341.

Alternatively, since the interface of the Stream format can also handle data other than an XPS document, the output data may be data generated by processing the XPS document 341, such as a print command interpretable by the printer 231. The XPS document 341 may be converted into another type of data, and then be transmitted.

The preview filter 223 employs the Document format as its input interface, and therefore acquires data divided into parts via that input interface. In this case, a preview display XPS document should be generated from the parts. However, generation of an XPS document similar to the print data cannot be achieved until all of the parts are acquired.

If the document has a large number of pages, it takes a long time to acquire all of the parts, and therefore a long time is required until a preview XPS document can be generated. As a result, it may take a long time before a preview control module 203 starts preview display processing.

Therefore, in the present exemplary embodiment, the preview control module 203 generates and displays a temporary display document based on print data of parts being short of full parts, thereby reducing the time taken to display a first page (i.e. the temporary display document is generated based on the print data fewer than all parts of the print document). The present exemplary embodiment will be described assuming that the print data of parts being short of full parts is print data of a page constituting the front surface of the first sheet in printing.

Figure 4:
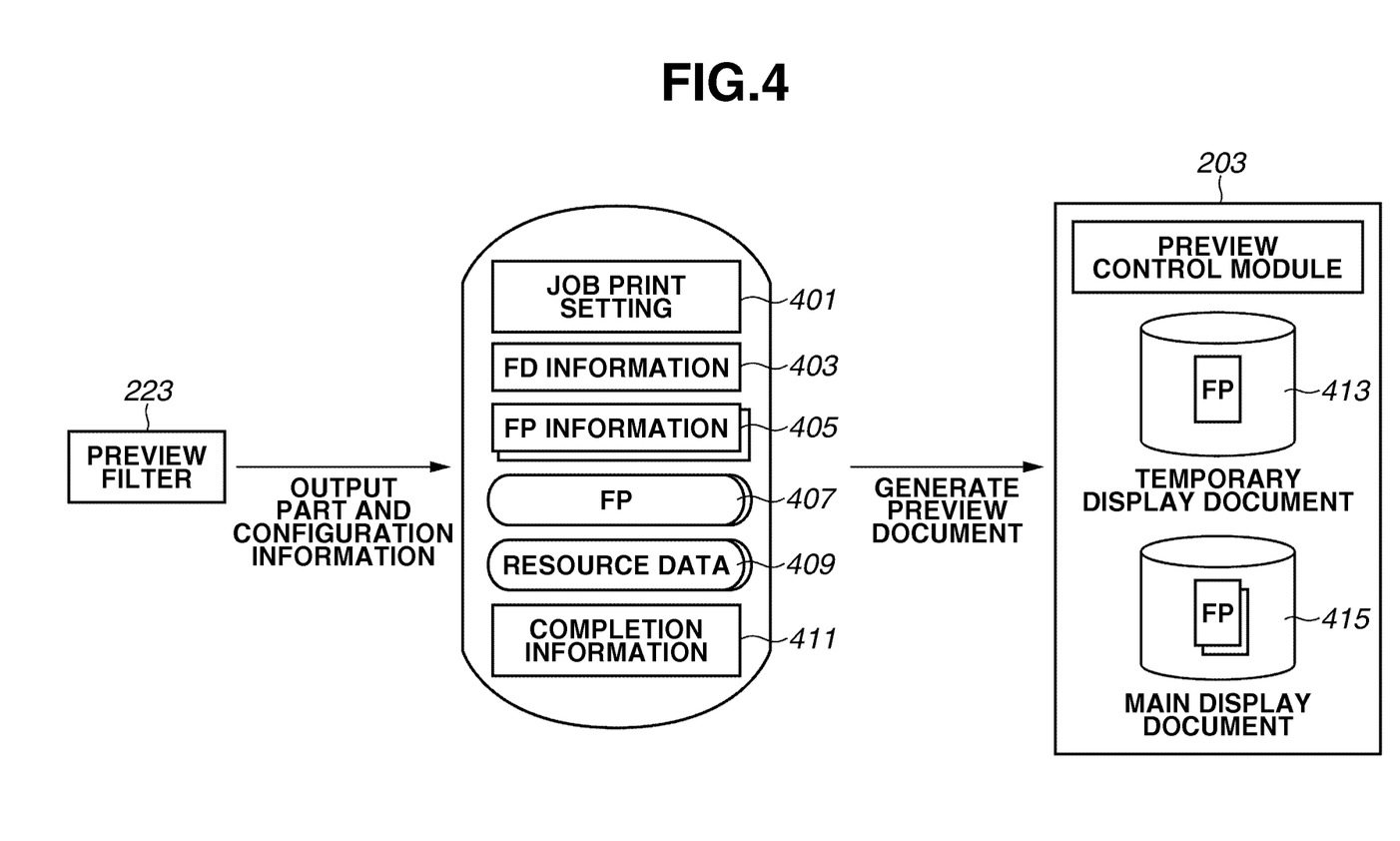
FIG. 4 illustrates a preview document generation unit according to the exemplary embodiment of the present invention.

FIG. 4 illustrates an example of a preview document generation unit.

The preview filter 223 stores an acquired XPS part and information required in generation of an XPS document from the part as a temporary file. A filter using the Document interface acquires an FDS part, an FD part, and an FP part in this order.

For example, in the XPS document illustrated in FIG. 1, parts are acquired in the order of the FDS 103, the FD 111, the FP 121, the FP 123, the FD 113, and the FP 125. Further, the resources 141 and 143 used by the respective parts can be acquired after acquisition of the parts using that resource.

Data 401, data 403, data 405, data 407, and data 409 are examples of data stored as a temporary file. The job print setting information 401 is a description of print setting information regarding whole print data, and is used for calculating the number of pages of the temporary display document. For example, the present exemplary embodiment is configured assuming that the temporary display document includes pages to be printed on the front surface of the first sheet. Therefore, the number of pages of the temporary display document is determined based on, for example, the number of pages to be printed on the front surface of the first sheet according to the multiple-up printing setting.

The FD information 403 is a description of, for example, the Uniform Resource Identifier (URI) of the FD in the XPS document. The data of the FD itself cannot be acquired by the preview filter 223, so the preview control module 203 should generate the FD by itself when generating the preview XPS document.

The FP information 405 is a description of, for example, the URI of the FP in the XPS document, information about a resource used by the FP, and the print setting information regarding the page. The FP 407 is data of the FP itself constituting the XPS document. The resource data 409 is resource data used by the FP. For example, an image and a font correspond to the resource data.

Completion information 411 indicates that an output of the parts from the preview filter 223 has been completed. The preview control module 203 detects that there is no more additional page by this completion information 411, and then ends XPS document generation processing. Needless to say, the format of a temporary file output from the preview filter 223 is not limited thereto, and can be changed according to an XPS document generation method.

The preview control module 203 generates a preview XPS document with use of the temporary file output from the preview filter 223. The preview control module 203 determines the number of pages required to generate a temporary display document based on the job print setting information 401.

Further, the preview control module 203 generates a temporary display document 413 and a main display document 415. The generated temporary display document 413 and the main display document 415 are empty data, respectively, at this stage.

The preview control module 203 adds the FP 407 (the page data) and the resource data 409 to the temporary display document 413 and the main display document 415 based on the FP information 405. The FP information 405 and the page-related data 407 to 409 are sequentially output by the preview filter 223, and therefore the preview control module 203 sequentially adds the data stored as a temporary file one after another.

After an addition of the number of pages required to generate the temporary display document 413, the preview control module 203 adds the FDS and the FD to the temporary display document 413 to format the data as an XPS document. The preview control module 203 displays this temporary display document 413 until the main display document 415 is completed, thereby enabling a preview display at an early stage before the main display document 415 is generated.

Then, after the output of all parts has been completed, and the generation of the main display document 415 has been completed, the preview control module 203 switches a document to be displayed from the temporary display document 413 to the main display document 415.

However, if the XPS document does not have so many pages, and there is no large difference between the timing of the completion of the temporary display document 413 and the timing of the completion of the main display document 415, the preview control module 203 omits the process of displaying the temporary display document 413 and directly proceeds to a display of the main display document 415. This processing will be described in detail with reference to steps S211 to S215 illustrated in FIG. 7.

Figure 5:
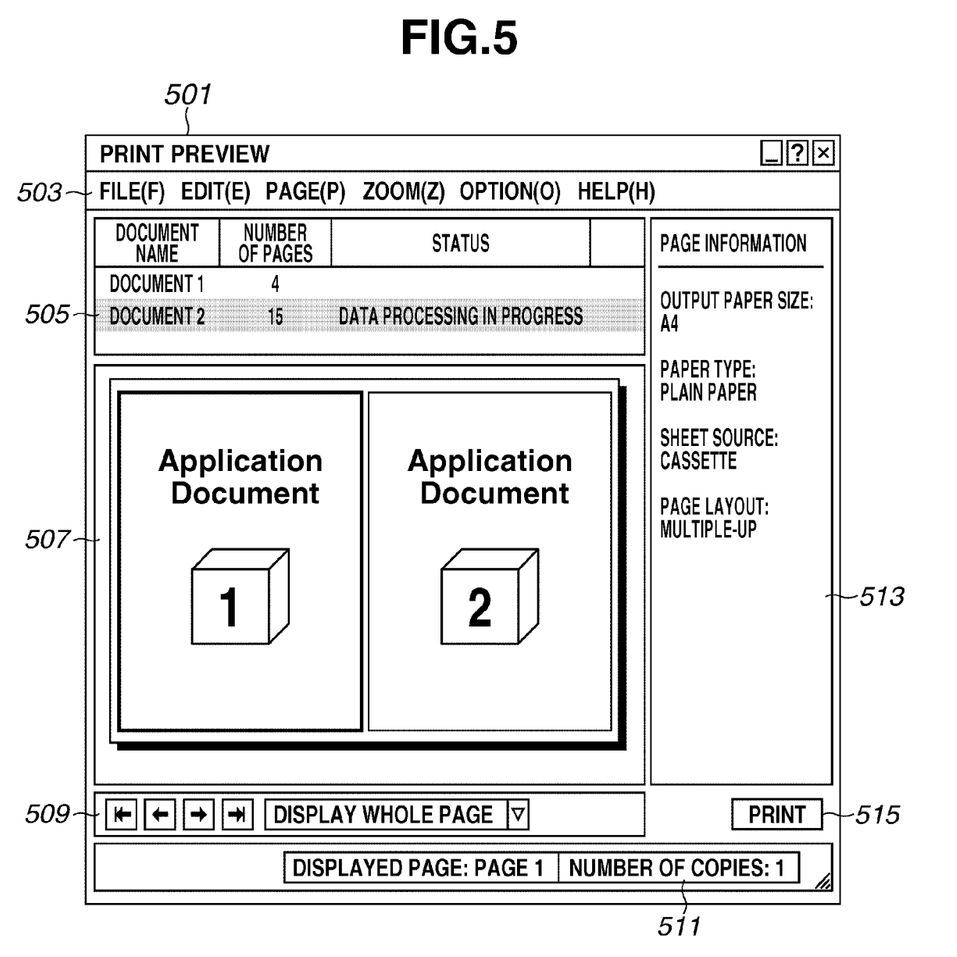
FIG. 5 illustrates an example of a preview window according to the exemplary embodiment of the present invention.

FIG. 5 illustrates an example of a display screen (preview window) provided by the preview control module 203 according to the present exemplary embodiment.

A print preview window 501 includes a display area for displaying, for example, a preview image and the print setting information of print data, and an input unit for allowing the user to change, for example, the display method of the preview image.

A menu bar 503 can receive a command from the user to a previewer, such as display switching. A document list 505 shows a list of print data that the preview control module 203 can process.

The print data selected in the document list 505 is set as a display target or a print target. A document that is being temporarily displayed is accompanied by information such as a message "DATA PROCESSING IN PROGRESS" in a status field, indicating that the main display document 415 is being currently generated. Further, the number of pages of the document is displayed in a number of pages field. When the preview control module 203 is displaying the temporary display document 413, the preview control module 203 is generating the main display document 415 simultaneously. The preview control module 203 updates the content of the number of pages field according to the number of FPs added to the main display document 415 that the preview control module 203 is currently generating, whereby the preview control module 203 can notify the user of a generation status of the main display document 415.

A preview display area 507 shows a print sheet and a visible image to be formed on the print sheet as a print image with use of the preview XPS document. Both the preview image of the temporary display document 413 and the preview image of the main display document 415 are displayed in the preview display area 507.

A tool bar 509 includes a user operation unit allowing the user to switch a displayed page and change a display size. A display area 511 shows set values of representative setting items regarding the print setting information of the print document that is being currently displayed by the preview function. FIG. 5 illustrates such an example that a first page is being currently displayed as a preview image, and the number of copies is set to 1 according to the print setting information.

A page information display area 513 shows set values of representative setting items regarding the print setting information of the page that is being currently displayed. The preview control module 203 can not only display the respective set values but also provide a change function. Pressing a print button 515 by the user starts printing of print data selected in the document list 505.

Figure 6:
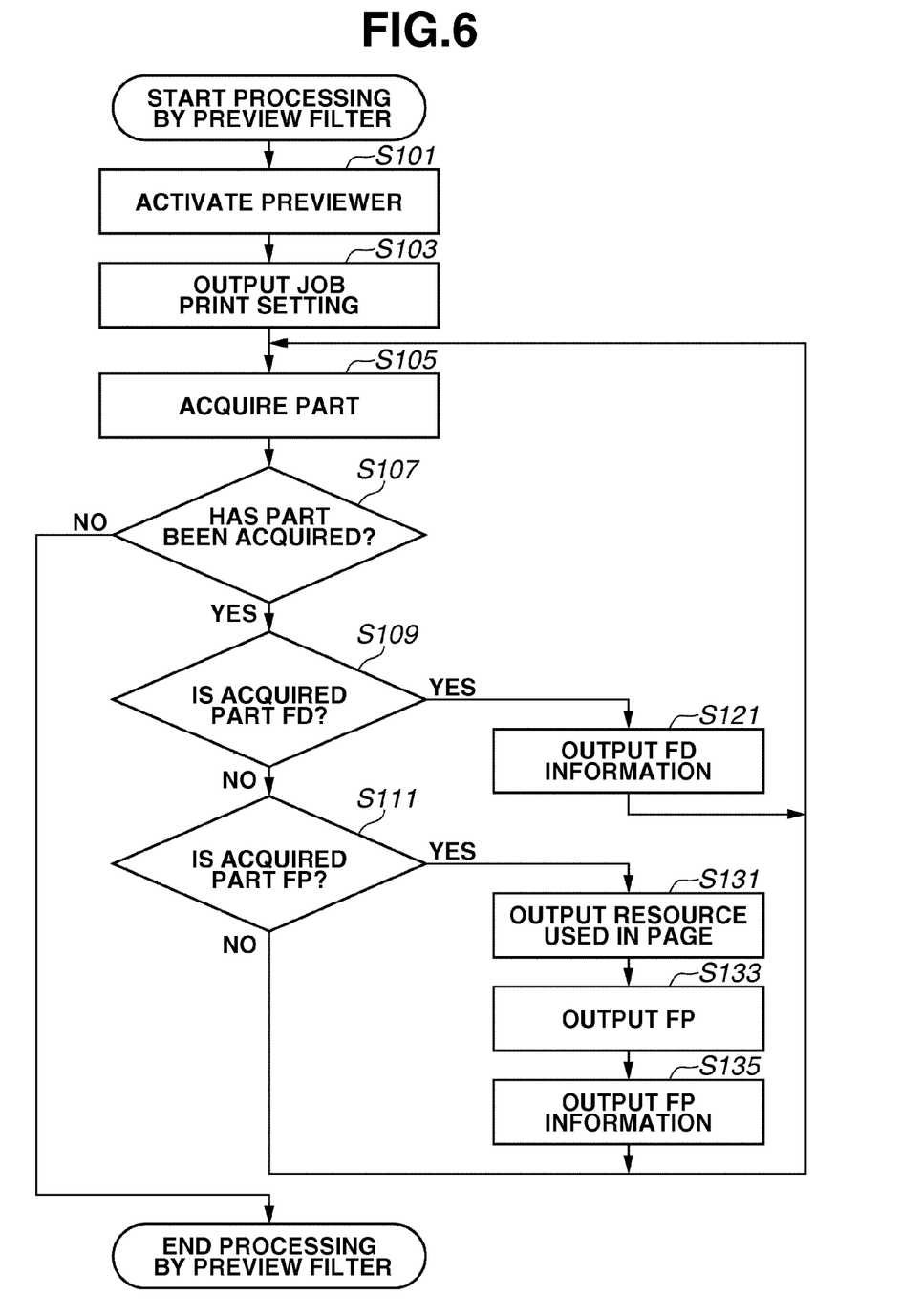
FIG. 6 illustrates an example of processing performed by a preview filter according to the exemplary embodiment of the present invention

FIG. 6 is an example of a flowchart illustrating processing performed by the preview filter 223.

The processing illustrated in FIG. 6 is performed in a case where the printing system is set to perform a preview. In a case where the printing system is not set to perform a preview, processing for outputting print data to the next filter is necessary. Further, the CPU 1 reads out the program related to the flowchart from the memory to execute it, by which the respective steps in the flowcharts in the present invention are realized.

In step S101, the preview filter 223 activates the preview control module 203. In step S103, the preview filter 223 outputs the print setting information regarding the whole job as a temporary file. In step S105, the preview filter 223 acquires an XPS part.

In step S107, the preview filter 223 determines whether the preview filter 223 has acquired the XPS part. If the preview filter 223 has acquired the XPS part (YES in step S107), the processing proceeds to step S109. If the preview filter 223 determines in step S107 that the preview filter has not acquired the XPS part (NO in step S107), this means that processing of all parts has been completed, so the processing by the preview filter 223 ends.

In step S109, the preview filter 223 determines whether the part acquired in step S105 is an FD. If the acquired part is the FD (YES in step S109), the processing proceeds to step S121. If the acquired part is not the FD (NO in step S109), the processing proceeds to step S111. The preview filter 223 inquires the type of the acquired part to the OS, whereby step S109 is realized.

In step S121, the preview filter 223 outputs the information of the FD required to generate the preview XPS document as a temporary file, and the processing proceeds to step S105 again for acquisition of the next part. For example, the URI of the FD in the XPS is written as FD information. In step S111, the preview filter 223 determines whether the acquired part is an FP. If the acquired part is the FP (YES in step S111), the processing proceeds to step S131. If the acquired part is not the FP (NO in step S111), the processing proceeds to step S105 again for acquisition of the next part.

The preview filter 223 inquires the type of the acquired part to the OS, whereby step S111 is realized. In step S131, the preview filter 223 outputs a resource used by the acquired FP as a temporary file. In step S133, the preview filter 223 outputs the acquired FP itself as a temporary file.

In step S135, the preview filter 223 outputs the FP information required to generate the preview XPS document as a temporary file. The relationship between the FP and the resource output as the temporary files, and the print setting information regarding the FP (for example, a paper size) are written as the FP information.

Steps S105 to S135 are repeated. After processing of all parts has been completed, in step S107, the preview filter 223 determines that the preview filter 223 has not acquired a part at this time. Then, the processing by the preview filter 223 ends.

Figure 7:
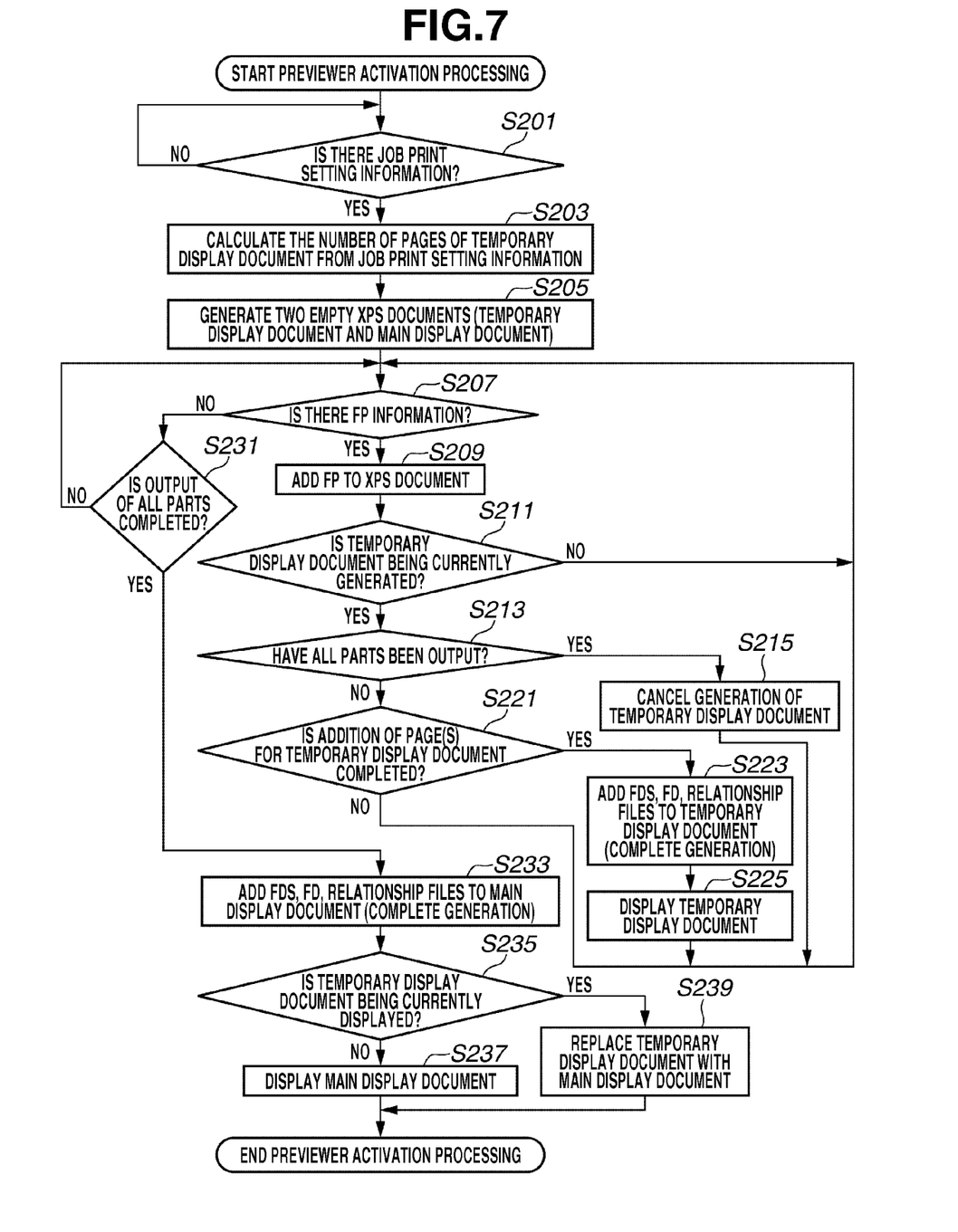
FIG. 7 illustrates an example of processing performed by a preview control module according to the exemplary embodiment of the present invention.

FIG. 7 is an example of a flowchart illustrating processing performed by the preview control module 203.

First, in step S201, the preview control module 203 determines whether there is the job print setting information 401 as a temporary file. If there is the job print setting information 401 as a temporary file (YES in step S201), the processing by the preview control module 203 proceeds to step S203. If there is not the job print setting information 401 as a temporary file (NO in step S201), the processing proceeds to step S201 again, and then the preview control module 203 waits until the preview filter 223 outputs the job print setting information 401.

In step S203, the preview control module 203 calculates the number of pages required to generate the temporary display document 413 based on the job print setting information 401. Then, the processing proceeds to step S205.

The present exemplary embodiment is configured assuming that the preview control module 203 displays the front surface of the first sheet as the temporary display document 413, so that one possible method for this calculation is, for example, to employ the number of pages to be printed on the surface of the first sheet according to the multiple-up printing setting. However, the method of calculating the number of pages is not limited thereto. For example, for poster printing, which prints one page across a plurality of sheets, the preview control module 203 may display the temporary display document 413 corresponding to the number of sheets required to print one page (two sheets, if one page is divided into two sheets).

Further, the present exemplary embodiment is configured assuming that the preview control module 203 displays the front surface of the first sheet as the temporary display document 413, but this does not limit the present invention. For example, the preview control module 203 may display the first sheet as the temporary display document 413. In this case, the preview control module 203 calculates the number of pages to be printed on the first sheet inconsideration of whether the printing system is set in a two-sided printing mode. Other than these methods, any number can be freely set as the number of pages required to generate the temporary display document 413, for example, the preview control module 203 may set the number of pages to be printed on a plurality of sheets, or the number of pages to be printed on a part of one sheet.

In step S205, the preview control module 203 generates bases for two XPS documents, namely, the temporary display document 413 and the main display document 415. Then, the processing proceeds to step S207. The data generated in step S205 is not in the form of an XPS document, and this document is completed as a displayable XPS document when all of required parts are added thereto.

In step S207, the preview control module 203 determines whether there is the FP information 405 as a temporary file. If there is the FP information 405 as a temporary file (YES in step S207), the processing proceeds to step S209. If there is not the FP information 405 as a temporary file (NO in step S207), the processing proceeds to step S231.

In step S231, the preview control module 203 determines whether all parts have been already output from the preview filter 223. If all parts have been already output (YES in step S231), the processing proceeds to step S233. On the other hand, if the output of the all parts has not been completed yet (NO in step S231), since there may be some pages left to be processed, the processing by the preview control module 203 proceeds to step S207 again, in which the preview control module 203 waits for an output of the FP information 405.

In step S209, the preview control module 203 adds the FP and the resource used by this page to the two bases of the temporary display XPS document 413 and the main display XPS document 415 generated in step S205. Then, the processing proceeds to step S211. However, if the generation of the temporary display document 413 is completed or canceled, the preview control module 203 adds the page only to the main display document 415.

In step S211, the preview control module 203 determines whether the temporary display document 413 is being currently generated. If the temporary display document 413 is being currently generated (YES in step S211), the processing proceed to step S213. If the generation of the temporary display document 413 is completed or canceled (NO in step S211), the processing proceeds to step S207 again. Then, the preview control module 203 starts to process the next page.

In particular, the preview control module 203 makes the determination of step S211 by determining whether step S215 or step S225 has been already performed. For example, if step S225 has been already performed, the preview control module 203 determines in step S211 that the generation of the temporary display document 413 has been completed (NO in step S211), and then the processing proceeds to the step corresponding to the answer NO.

In step S213, the preview control module 203 determines whether all parts have been already output from the preview filter 223. If all parts have been already output (YES in step S213), the processing proceeds to step S215. If the output process is still in progress (NO in step S213), the processing proceeds to step S221. One possible method to make the determination of step S213 is as follows. The preview filter 223 outputs the completion information 411 after completing the output of all parts. Then, the preview control module 203 may determine that all parts have been already output if there is the completion information 411. However, the preview control module 203 may make the determination of step S213 in other manners.

If the preview control module 203 acquires all parts before the temporary display document 413 is generated (YES in step S213), no large time lag is generated between the timing of the completion of the temporary display document 413 and the timing of the completion of the main display document 415. Therefore, in step S215, the preview control module 203 cancels the generation of the temporary display document 413. Then, the processing proceeds to step S207 again. In other words, the preview control module 203 determines whether to display the temporary display document 413 according to an output status of the parts from the preview filter 223.

The present exemplary embodiment sets incompletion of the output of the parts from the preview filter 223 until the generation of the temporary display document 413 is completed, as a condition for displaying the temporary display document 413. However, this does not limit the present invention.

In step S221, the preview control module 203 determines whether pages are added by an amount corresponding to the number of pages of the temporary display document 413 determined in step S203. If the required number of pages are added (YES in step S221), the processing proceeds to step S223. If there are some pages left to be added (NO in step S221), the processing proceeds to step S207 again. In step S223, the preview control module 203 adds, for example, the FDS, the FD, and a file indicating the relationship among the respective parts to the temporary display document 413. Then, the processing proceeds to step S225. At this time, the temporary display document 413 is in the form of a complete XPS document, and therefore is in a displayable state.

In step S225, the preview control module 203 displays the generated temporary display document 413 on the preview window 501, and then the processing proceeds to step S207 again. The temporary display document 413 is kept displayed until the generation of the main display document 415 is completed. Further, the document information is added to the document list 505 at the moment when the temporary display document 413 thereof is displayed. At this time, a message indicating that this display is a temporary display, such as "DATA PROCESSING IN PROGRESS", is added to the status field.

After the temporary display document 413 is displayed in step S225, the processing proceeds to step S207 again, and the next page starts to be processed. Until processing of all pages is completed, steps S207, S209, and S211 are repeated.

If the preview control module 203 determines in step S231 that all parts have been output from the preview filter 223 (YES in step S231), the processing proceeds to step S233, since processing of all pages has been completed. In step S233, the preview control module 203 adds, for example, the FDS, the FD, and a file indicating the relationship among the respective parts to the main display document 415. Then, the processing proceeds to step S235.

At this time, the main display document 415 is also set in a displayable state. In step S235, the preview control module 203 determines whether the temporary display document 413 is being currently displayed. If the temporary display document 413 is not being currently displayed (NO in step S235), the processing proceeds to step S237. If the temporary display document 413 is being currently displayed (YES in step S235), the processing proceeds to step S239.

In step S237, the preview control module 203 displays the main display document 415 on the preview window 501, and adds the document information to the document list 505.

In step S239, the preview control module 203 replaces the temporary display document 413 with the main display document 415 for the document set as a display target. At this time, since the document information is already added to the document list 505, the preview control module 203 does not have to newly add the document information. However, the preview control module 203 deletes the notification indicating that the current display is a temporary display. When the main display document 415 starts to be displayed in step S237 or step S239, the processing of activating the preview control module 203 ends.

As a result, even in a case where the preview filter 223 uses the Document format as an interface, it is possible to display a preview at an early stage, which would otherwise be unable to be displayed until all parts constituting the XPS document are acquired and the generation of the main display document 415 is completed.

The method of generating the temporary display document 413 in the present exemplary embodiment is just an example, and the timing illustrated in the flowchart does not limit the present invention. For example, the preview control module 203 may collectively perform all processes from generation to completion of the temporary display document 413 when the preview filter 223 outputs the number of pages required to generate the temporary display document 413 in step S221.

On the display screen illustrated in FIG. 5, the user can edit a preview image. More specifically, the user can delete a page or change the order of pages. For example, if the second page is deleted, in response to an instruction by the user, in a preview image displayed in consideration of the setting of 2 in 1 printing, the front surface of the first sheet is changed to a preview image including the first page and the third page.

However, when the temporary display document 413 is being displayed, it is impossible to display an appropriate preview image reflecting the user's edition or reflecting the user's edit (e.g., a revised or edited version of the preview image is displayed incorporating the edit made by the user; a user request to edit the image has been incorporated into the preview image; a user's edit(s) of the preview image; a user's revision(s) of the preview image; etc.) since the output of all pages has not been completed yet. More specifically, when the temporary display document 413 is being displayed, the preview image of the third page is not generated yet, so that the front surface of the first sheet can contain only the preview image of the first page, even when the second page is deleted in the preview image displayed in consideration of the setting of 2 in 1 printing.

In this way, it is impossible to display an appropriate result from the user's edition or from the user's edit (e.g., a revised or edited version of the preview image is displayed incorporating the edit made by the user; a user request to edit the image has been incorporated into the preview image; a user's edit(s) of the preview image; a user's revision(s) of the preview image; etc.) in the preview image of the temporary display document 413, whereby the preview control module 203 controls the display of the display screen illustrated in FIG. 5 so as to reject an edition instruction or so as to reject an edit instruction (e.g., an instruction to edit the preview image, an instruction to revise the preview image; etc.) by the user during the display of the preview image of the temporary display document 413. On the other hand, the preview control module 203 controls the display of the display screen illustrated in FIG. 5 so as to accept the edition instruction or so as to accept the edit instruction (e.g., an instruction to edit the preview image, an instruction to revise the preview image; etc.) when the preview image of the main display document 415 starts to be displayed.

Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-113826 filed May 20, 2011, which is hereby incorporated by reference herein in its entirety.

What is claimed is:

1. A control method performed by an information processing apparatus configured to display a main display document generated from print data of all parts of a print document, the control method comprising:

generating a temporary display document, to be displayed prior to the main display document, based on print data of at least one part fewer than all parts of the print document;

displaying the generated temporary display document;

determining whether all parts of the print document are acquired;

generating, when it is determined that the all parts of the print document are acquired, the main display document including all pages of the print document based on the print data of the all parts of the acquired print document;

changing a display from the temporary display document to the main display document when the main display document is generated;

determining whether all parts of the print document have already been output before generation of the temporary display document is completed; and determining that the temporary display document should not be displayed when it is determined that all parts of the print document have already been output before generation of the temporary display document is completed.

2. The control method according to claim 1, further comprising:

calculating a number of pages required to generate the temporary display document from print setting information included in the print document; and generating the temporary display document corresponding to the calculated number of pages based on the print data of the parts of the print document corresponding to the calculated number of pages.

3. The control method according to claim 1, further comprising:

calculating a number of pages required to generate the temporary display document from print setting information included in the print document;

identifying or determining whether the parts of the print documents corresponding to the calculated number of pages are acquired; and determining whether to display the temporary display document according to an output status of parts of the print document when it is identified or determined that the parts of the print documents corresponding to the calculated number of pages are acquired.

4. The control method according to claim 1, further comprising displaying information indicating that the temporary display document is displayed, while displaying the temporary display document.

5. The control method according to claim 4, further comprising:
(i) identifying or determining whether the display target is changed from the temporary display document to the main display document; and (ii) deleting the information indicating that the temporary display document is displayed when it is identified or determined that the display target is changed from the temporary display document to the main display document.

6. The control method according to claim 1, wherein the print document is in an XML Paper Specification format and includes parts.

7. An information processing apparatus configured to display a main display document generated from print data of all parts of a print document, the information processing apparatus comprising:
at least one processor and at least one memory coupled to each other and operating to:
generate a temporary display document, to be displayed prior to the main display document, based on print data of at least one part fewer than all parts of the print document;
display the generated temporary display document;
determine whether all parts of the print document are acquired;
when it is determined that the all parts of the print document are acquired, generate the main display document including all pages of the print document based on the print data of the acquired all parts of the print document; and
change a display from the temporary display document to the main display document when the main display document is generated,
wherein the at least one processor and the at least one memory further operate to: (i) determine whether to display the temporary display document according to an output status of the parts of the print document, (ii) determine whether all parts of the print document have already been output before generation of the temporary display document is completed, and (iii) determine that the temporary display document should not be displayed when it is determined that all parts of the print document have already been output before generation of the temporary display document is completed.

8. The information processing apparatus according to claim 7, wherein the at least one processor and the at least one memory further operate to calculate a number of pages required to generate the temporary display document from print setting information included in the print document, and
wherein the at least one processor and the at least one memory generate the temporary display document corresponding to the number of pages calculated by the at least one processor and the at least one memory based on the print data of the parts of the print document corresponding to the number of pages calculated by the at least one processor and the at least one memory.

9. The information processing apparatus according to claim 7, wherein the at least one processor and the at least one memory further operate to:
(i) calculate a number of pages required to generate the temporary display document from print setting information included in the print document;
(ii) identify or determine whether the parts of the print document corresponding to the number of pages calculated by the at least one processor and the at least one memory are acquired; and
(iii) determine whether to display the temporary display document according to an output status of the parts of the print document when it is identified or determined that the parts of the print document corresponding to the number of pages calculated by the at least one processor and the at least one memory are acquired.

10. The information processing apparatus according to claim 7, wherein the at least one processor and the at least one memory further operate to display information indicating that the temporary display document is displayed, while displaying the temporary display document.

11. The information processing apparatus according to claim 10, wherein the at least one processor and the at least one memory further operate to: (i) identify or determine whether the at least one processor and the at least one memory change the display target from the temporary display document to the main display document; and (ii) delete the information indicating that the temporary display document is displayed when it is identified or determined that the at least one processor and the at least one memory change the display target from the temporary display document to the main display document.

12. The information processing apparatus according to claim 7, wherein the at least one processor and at least one memory further operate to control the display of the temporary display document to reject an edit instruction by the user during the display of the temporary display document.

13. The information processing apparatus according to claim 7, wherein the temporary display document and the main display document are generated at least one of simultaneously and in parallel.

14. The information processing apparatus according to claim 7, wherein:
(i) the at least one processor and at least one memory generate the temporary display document by generating an empty temporary display document and sequentially adding the parts to the temporary display document; and
(ii) the at least one processor and at least one memory generate the main display document by generating an empty main display document and sequentially adding the parts to the main display document.

15. The information processing apparatus according to claim 7, wherein each part of the print document comprise a page such that:
(i) all the parts of the print document comprise all pages of the print document;
(ii) the temporary display document includes at least one fewer page than all of the pages of the print document; and
(iii) the main display document includes all the pages of the print document.

16. The information processing apparatus according to claim 7, wherein at least one of:
(i) the at least one part fewer than all the parts of the print document that is in the temporary display document overlaps with one or more parts of all the parts of the print document that are in the main display document, or the at least one part fewer than all the parts of the print document that are in the temporary display document overlap with one or more parts of all the parts of the print document that are in the main display document; and (ii) the temporary display document and the main display document each include at least one overlapping part.

17. The information processing apparatus according to claim 7, wherein the main display document is automatically generated based on the print data of the all parts of the print document.

18. The information processing apparatus according to claim 7, wherein, when the main display document is generated, the display is automatically changed from the temporary display document to the main display document.

19. The information processing apparatus according to claim 7, wherein the temporary display document and the main display document are separate, independent files.

20. The information processing apparatus according to claim 7, wherein the temporary display document and the main display document are displayed between output processing of the print document by an application and generating processing of a print command by a printer driver.

21. A non-transitory computer-readable storage medium storing a program configured to be performed by an information processing apparatus that displays a main display document generated from print data of all parts of a print document, the program being capable of causing the information processing apparatus to perform the following processes:

generating a temporary display document, to be displayed prior to the main display document, based on print data of at least one part fewer than all parts of the print document;

displaying the generated temporary display document;

determining whether all parts of the print document are acquired;

generating, when it is determined that the all parts of the print document are acquired, the main display document including all pages of the print document based on the print data of the all parts of the acquired print document;

changing a display from the temporary display document to the main display document when the main display document is generated;

determining whether all parts of the print document have already been output before generation of the temporary display document is completed; and determining that the temporary display document should not be displayed when it is determined that all parts of the print document have already been output before generation of the temporary display document is completed.

22. The storage medium according to claim 21, the program being capable of causing the information processing apparatus to further perform the following processes:

calculating a number of pages required to generate the temporary display document from print setting information included in the print document; and generating the temporary display document corresponding to the calculated number of pages based on the print data of the parts of the print document corresponding to the calculated number of pages.

23. The storage medium according to claim 21, the program being capable of causing the information processing apparatus to further perform the following processes:

calculating a number of pages required to generate the temporary display document from print setting information included in the print document;

identifying or determining whether the parts of the print documents corresponding to the calculated number of pages are acquired; and determining whether to display the temporary display document according to an output status of parts of the print document when it is identified or determined that the parts of the print documents corresponding to the calculated number of pages are acquired.

24. The storage medium according to claim 21, the program being capable of causing the information processing apparatus to further perform the process of displaying information indicating that the temporary display document is displayed, while displaying the temporary display document.

25. The storage medium according to claim 24, the program being capable of causing the information processing apparatus to further perform the processes of: (i) identifying or determining whether the display target is changed from the temporary display document to the main display document; and (ii) deleting the information indicating that the temporary display document is displayed when it is identified or determined that the display target is changed from the temporary display document to the main display document.

* * * * *